United States Patent
Lerner et al.

(10) Patent No.: US 7,497,579 B2
(45) Date of Patent: Mar. 3, 2009

(54) ACTIVE COLOR WHEEL

(75) Inventors: Scott Lerner, Corvallis, OR (US); John R. Sterner, Albany, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 210 days.

(21) Appl. No.: 11/219,421

(22) Filed: Sep. 2, 2005

(65) Prior Publication Data

US 2007/0052938 A1 Mar. 8, 2007

(51) Int. Cl.
*G03B 21/20* (2006.01)
*F21V 5/00* (2006.01)
*F21V 21/00* (2006.01)
*G02B 6/32* (2006.01)

(52) U.S. Cl. .......................... 353/85; 353/87; 353/84; 362/170; 362/249; 362/55; 362/580; 385/34; 385/133

(58) Field of Classification Search ............... 353/122, 353/29, 30, 31, 37, 52, 57, 60, 84, 85, 87, 353/94, 98, 99, 102; 362/170, 218, 227, 362/249, 257, 264, 269, 294, 317, 345, 373, 362/547, 551, 555, 561, 580, 612; 349/5, 349/7; 359/34; 385/34, 133, 901
See application file for complete search history.

(56) References Cited

U.S. PATENT DOCUMENTS

| | | | |
|---|---|---|---|
| 5,302,965 A * | 4/1994 | Belcher et al. | 345/31 |
| 6,461,001 B2 * | 10/2002 | Okamori et al. | 353/102 |
| 6,914,734 B1 | 7/2005 | Kao et al. | |
| 6,926,435 B2 | 8/2005 | Li | |
| 2003/0218723 A1 * | 11/2003 | Yamanaka | 353/30 |
| 2004/0125601 A1 * | 7/2004 | Coates et al. | 362/284 |
| 2005/0062937 A1 * | 3/2005 | Imade et al. | 353/31 |

* cited by examiner

*Primary Examiner*—Rochelle-Ann J Blackman

(57) ABSTRACT

According to one exemplary embodiment discussed herein, an active color wheel is provided. The active color wheel according to one exemplary embodiment includes a plurality of light sources configured to be moved through a period of motion. Further, the plurality of light sources are configured to be activated over a range of the period of motion.

32 Claims, 5 Drawing Sheets

ACTIVE COLOR WHEEL

BACKGROUND

Micro-electromechanical systems (MEMS) are used in a variety of applications, including optical display systems. Such systems often include a light source that projects light rays onto a light modulator panel. In many optical display systems, the light modulator panel includes an array of MEMS devices commonly referred to as pixels. The pixels modulate light to control its color, intensity, hue, or other characteristics. Light modulator panel or panels modulate light that is directed thereto. As such, light modulator panels frequently do not produce light, but rather modulate light that is directed thereto.

Light modulated by light modulator panels is frequently generated by a light source module. In the case of reflective-type light modulator panels, the light source module generates sequentially color-varying light. For example, light source modules frequently include a burner coupled to a reflector that produces intense light that is directed out of the light source module. The light is then passed through a color wheel to produce sequentially color-varying light. In particular, the color wheel frequently includes red, green, and blue filters arranged and rotated such that as multi-component or white light is passed therethrough, red, green, and blue light is produced sequentially.

In addition to generating light, light source modules also produce heat. Light source modules that make use of a burner frequently produce intense heat. These systems make use of relatively complicated systems to account for the intense heat. Further, the color wheels may also be complicated to produce and operate.

Recent designs have been directed to using solid state devices to produce light. Such solid state devices produce relatively dim light at constant operating conditions. Efforts have been directed to combine the output of light from several such solid state devices. The light a light modulator panel is able to utilize depends, at least in part, on the etendue of a projection lens coupled thereto. In particular, a portion of light with an etendue value greater than that of the projection lens may be wasted. The etendue of the light depends on the area of the beam of light as well as the solid angle of the beam at that point. Combining solid state devices spatially and/or angularly frequently results in an increase in the total etendue of the sources.

SUMMARY

An active color wheel includes a plurality of light sources configured to be moved through a period of motion, the plurality of light sources being configured to be activated over a range of the period of motion.

BRIEF DESCRIPTION OF THE DRAWINGS

The accompanying drawings illustrate various embodiments of the present apparatus and methods and are a part of the specification. The illustrated embodiments are merely examples of the present apparatus and methods and do not limit the scope of the disclosure.

Throughout the drawings, identical reference numbers designate similar, but not necessarily identical, elements.

DETAILED DESCRIPTION

A light source module is provided herein for use in projection systems. The light source module includes a plurality of light sources that are moved along a periodically repeating path. The periodically repeating path includes a firing zone. Each light source is activated for at least a portion of the time the light source is in the firing zone. The light from the multiple light sources may thus be temporally combined with an etendue that depends on the dimensions of the firing zone.

Further, according to one exemplary embodiment discussed in more detail below, each light source may produce a relatively high output while in the firing zone and at a reduced output while outside the firing zone. Additionally, the light sources may be selected to include light sources configured to generate sequentially color varying light. Such a configuration may thus combine the function of a light source and a color wheel.

In the following description, for purposes of explanation, numerous specific details are set forth in order to provide a thorough understanding of the present methods and apparatus. It will be apparent, however, to one skilled in the art, that the present method and apparatus may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

Display Systems

Figure 1:
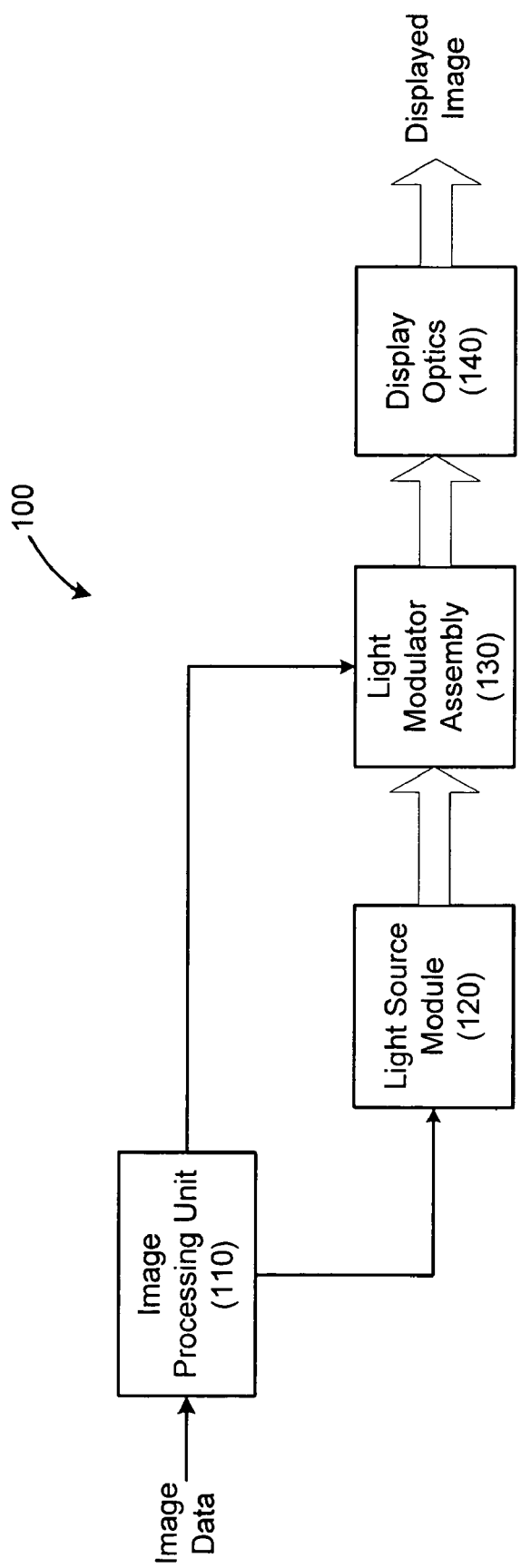
FIG. 1 illustrates a display system according to one exemplary embodiment.

FIG. 1 illustrates an exemplary display system (100). The components of FIG. 1 are exemplary only and may be modified or changed as best serves a particular application. As shown in FIG. 1, image data is input into an image processing unit (110). The image data defines an image that is to be displayed by the display system (100). While one image is illustrated and described as being processed by the image processing unit (110), it will be understood by one skilled in the art that a plurality or series of images may be processed by the image processing unit (110).

The image processing unit (110) performs various functions including controlling the illumination of a light source module (120) and controlling a light modulator assembly (130). The light source module (120) directs light toward the light modulator assembly (130).

The light source module (120), according to the present exemplary embodiment, is configured to provide sequentially varying light. In particular, the light source module may be configured to sequentially provide red, green, and blue light respectively. For example, the light source module (120) may include a plurality of rotating light sources to provide sequentially color varying light. As each light source is rotated, it passes through a periodic rotation of 2π (pi) radians or 360 degrees. According to another exemplary embodiment, the light source may rotate through a linearly reciprocating path.

By establishing a common reference point at some point in the periodic rotation, the relative location of each of the light sources may be established. Each of the individual light sources may be operated over a known range within the periodic rotation. fly operating the light sources over the same portion of the periodic rotation1 the light produced by each of the light sources is temporally combined, as if the light were produced by a single source. As a result, the light produced may have the etendue of light produced by a single source. This light is directed toward the light modulator panel.

As the light is directed toward the light modulator panel, the light may be directed through an integrator. An integrator may spatially homogenize the sequentially varying light. The integrator then directs the light to an illumination relay, which may also be part of the light source module (120), which directs the light to the light modulator assembly (130).

The light modulator assembly (130) includes one or more arrays of light modulator devices. The light modulator devices may be in the form of micro-electro mechanical (MEMS) devices or pixels, which are configured to selectively reflect light incident thereon toward a display, as discussed below. A portion of the light directed to the light modulator assembly (130) is modulated by the pixel arrays. This modulated light is then directed to display optics (140). The display optics (140) focus the modulated light onto a display surface to form an image. The non-modulated portion of the light may be directed away from the display optics (140), as will be discussed in more detail below. The light may also be refracted, absorbed, scattered, or diffracted away from the display optics.

The display optics (140) may include any device configured to display or project an image. For example, the display optics (140) may be, but are not limited to, a lens configured to project and focus an image onto a viewing surface. The viewing surface may be, but is not limited to, a screen, television, wall, liquid crystal display (LCD), or computer monitor.

Method of Modulating Light

Figure 2:
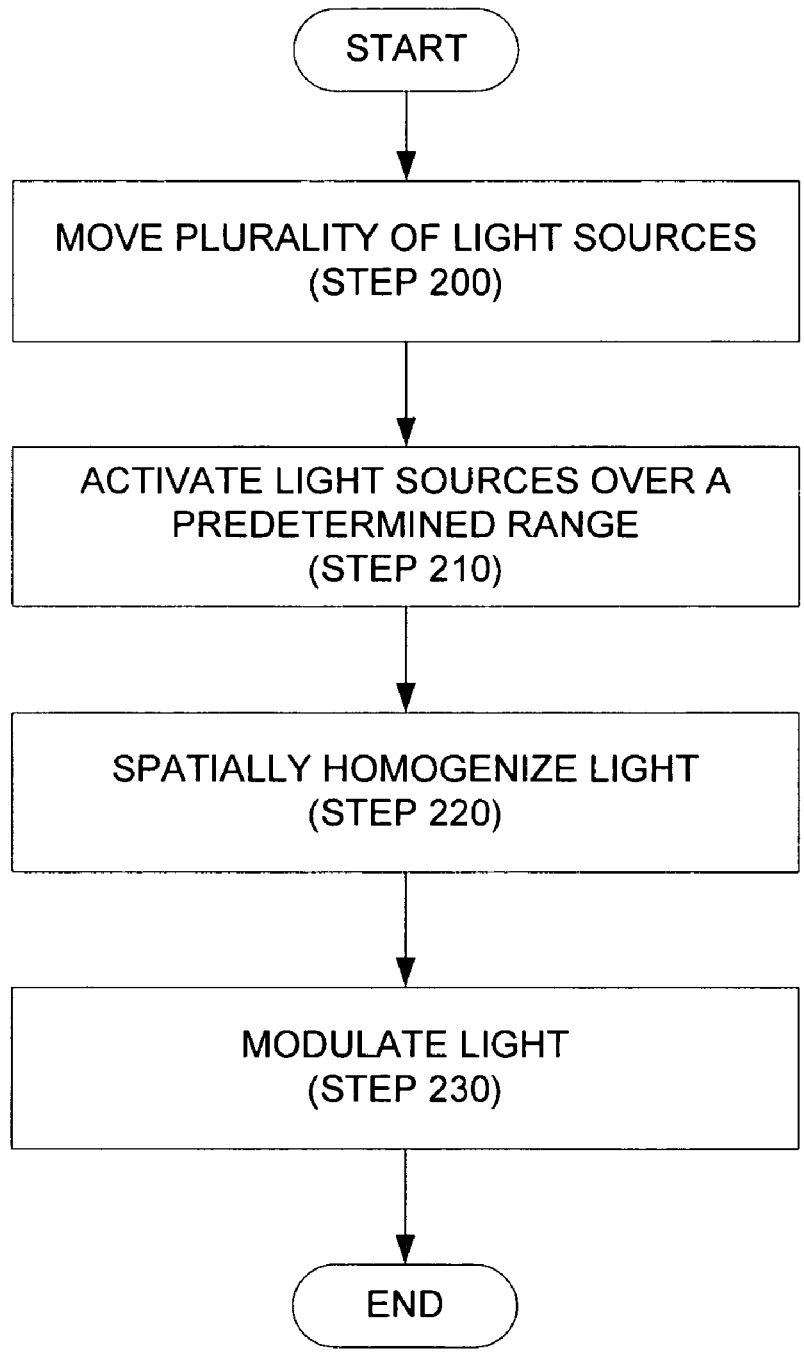
FIG. 2 is a flowchart illustrating a method of modulating light according to one exemplary embodiment

FIG. 2 illustrates an exemplary method of modulating light. The method begins by moving a plurality of light sources (step 200). For example, according to one exemplary method, the light sources are periodically rotated about a circular path. In particular, the light sources may be coupled to a rotor support, such as fan blade that is driven by a conventional DC brushless motor or other motor. Further, according to one exemplary method, the light sources may be moved by driving a support to which they are supported. The support may also include secondary transformers and circuitry coupled to each of the light sources.

The method also includes activating the light sources over a predetermined portion of the period of rotation traveled by the light sources (step 210). The light produced by the light sources originates from a single spatial location, which corresponds to the predetermined portion of the period of rotation. Thus, the light produced by several light sources appears to originate from a single source. Further, by sequentially activating light sources configured to produce different colors of light, the light sources may produce sequentially color-varying light.

Power to drive the light sources may be provided in any suitable way. According to one exemplary method, power is provided to the light sources inductively. In particular, as the light sources are rotated, the secondary transformer coils coupled thereto are passed through a gap in a primary transformer cable. As the secondary transformer coils pass through the gap, current is driven in the secondary transformer coil. The secondary transformer coil passes the current through the conditioning circuitry to the light sources to thereby power them, as described below.

Further, the light sources may be overdriven, such that as the light sources enter the predetermined portion of the period of rotation, the light sources produce relatively bright light. According to one exemplary embodiment, the light sources are solid state devices, such as light emitting diodes. The light output is then spatially homogenized (step 220).

The light modulator panel then modulates the light (step 230). According to one exemplary method, the light modulator panel may include an array of individual pixels. Each pixel may further include a reflective plate that is selectively tilted. According to the present method, when a pixel is ON, light incident thereon is directed toward display optics. Similarly, according to the present method, when a pixel is OFF, light incident thereon is directed away from the display optics. A generalized light source module will first be discussed, followed by a discussion of a light source module including an active color wheel.

Light Source Module with Rotating Light Sources

Figure 3:
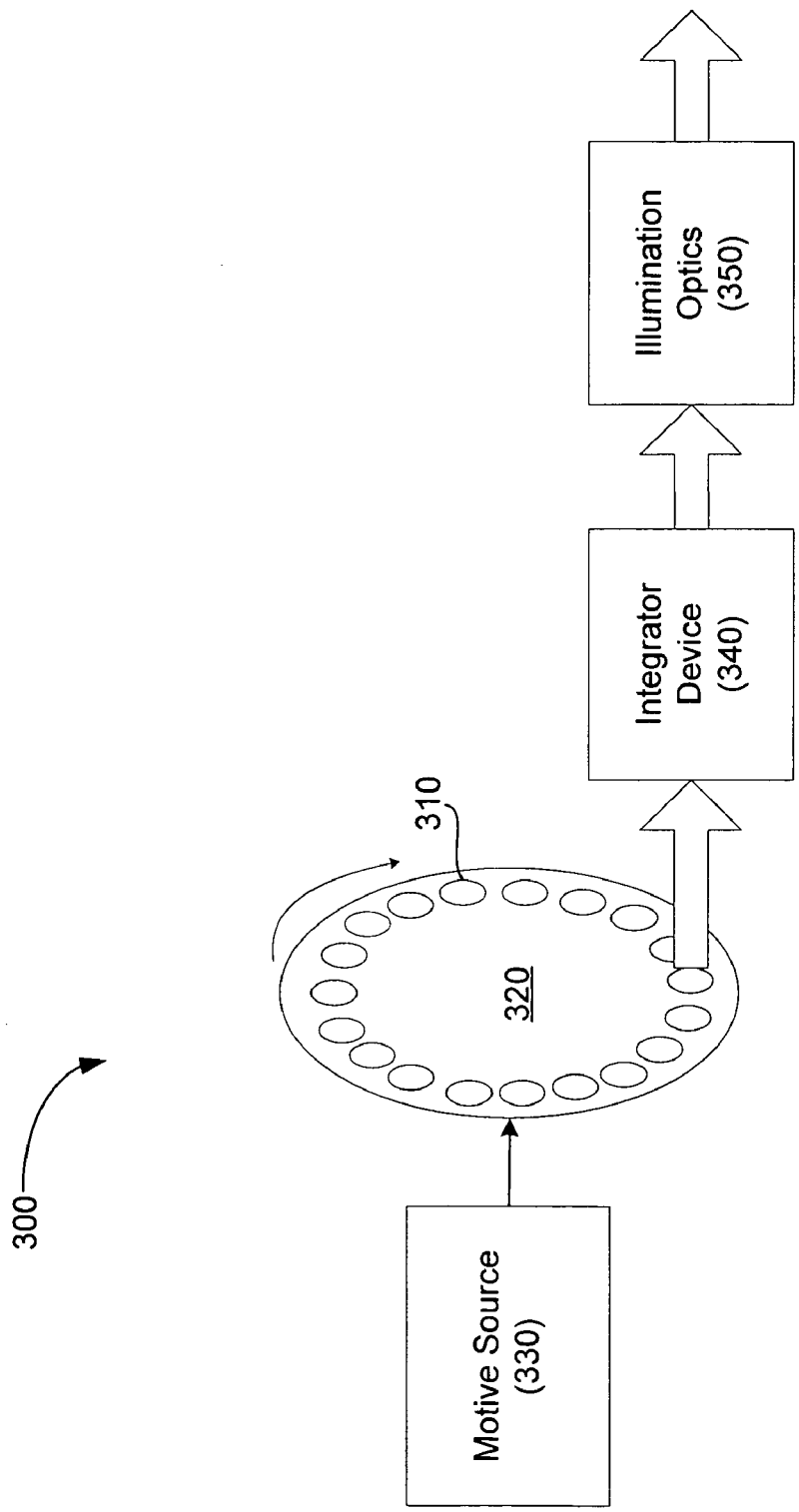
FIG. 3 is a schematic view of a light source module according to one exemplary embodiment.

FIG. 3 illustrates a schematic view of a light source module (300) that includes a plurality of rotating light sources (310) on a support (320), a motive source (330), and an optional integrator device (340). According to one exemplary embodiment, the rotating light sources (310) include red, blue, and green light sources. These light sources may be arranged such that as the rotating light sources (310) rotate, the light produced thereby is temporally combined at a single location. Further, the light sources may be configured to generate sequentially color-varying light.

The motive source (330) moves the support (320), and thus the rotating light sources (310). The rotating light sources (310), according to the present exemplary embodiment, are periodically moved about a path, such as a circular path. Thus, as the rotating light sources (310) are moved, the rotating light sources (310) follow a period of motion. This period of motion includes a firing zone. The firing zone represents the range in the period and thus the location from which the output of each of the rotating light sources (310) will be directed to the integrator device (340). The arc of the firing zone may be as wide as desired to maintain an intended etendue. Further, the location of the firing zone along the period of motion may be selected as desired.

In general, the output that a light source can produce over a given period of time corresponds to the heat generated by the light source at that output. As previously discussed, in addition to producing light, light sources also produce heat. If too much heat accumulates, it may cause device temperatures too high for reliable operations. Accordingly, the amount of light that a light source module is able to produce over a given period is frequently related to the ability of the system to dissipate heat. Thus, the output of light sources that are constantly operated may be related to the ability of the system to provide a reliable operating temperature.

Pulsing the output of each rotating light source (310) allows each light source to produce higher intensity light than produced at steady state operating conditions. In particular, the firing zone may represent a portion of the entire path traveled by each rotating light source (310). As each rotating light source (310) moves into the firing zone, the light source (310) is activated. Further, as each rotating light source (310) moves out of the firing zone, each rotating light source (310) may be operated at a substantially lower power. For example, the rotating light source (310) may be deactivated outside of the firing zone. Thus, each rotating light source (310) is operated for a relatively short period as it travels through a period of motion. Accordingly, heat produced by pulsing the rotating light source (310) is dissipated as the rotating light source (310) rotates through the remainder of the period of motion.

The light generated by the rotating light sources (310) may be directed to the integrator device (340). The light may also be homogenized by a lenslet array, faceted reflector or other means. The integrator device (340) spatially integrates the light, such that light exiting the integrator device (340) is more spatially uniform. Suitable integrator devices may include, without limitation, integrator rods and tunnels. The light from the integrator device (340) is then directed to illumination optics (350). The illumination optics (350) direct the light to a light modulator panel (130; FIG. 1).

Rotating LED Color Wheel

Figure 4:
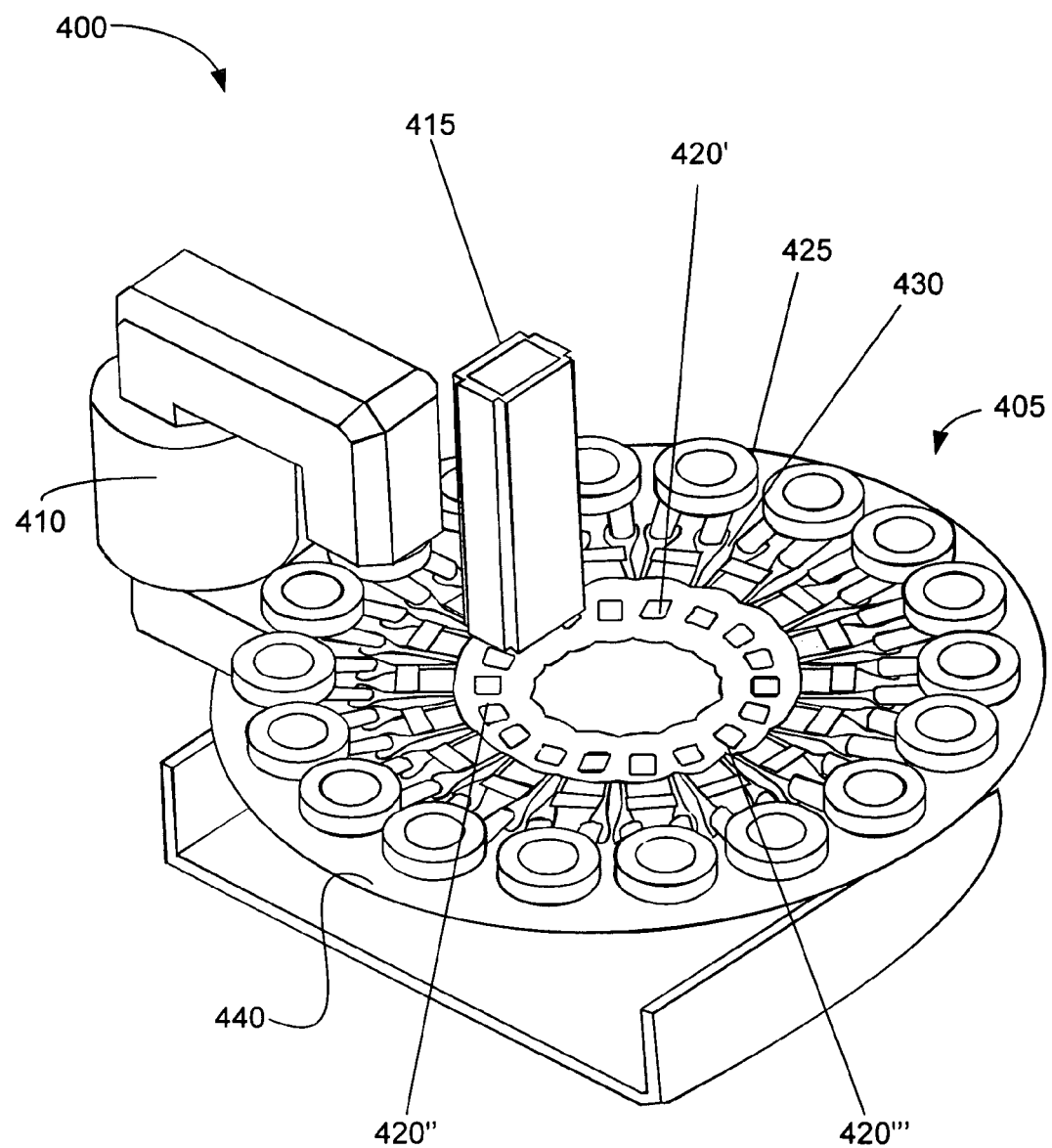
FIG. 4 is a perspective view of a light source module according to one exemplary embodiment.

FIG. 4 illustrates a perspective view of light source module (400) that includes a light emitting diode (LED) color wheel (405), primary transformer coil (410), and an integrating tunnel (415). The LED color wheel (405) according to the present exemplary embodiment includes a plurality of individual LEDs, such as red LEDs (420'), green LEDs (420"), and blue LEDs (420'''), secondary transformer coils (425), and circuitry (430) on a support, such as a disc (440). As will be discussed in more detail below, as the disc (440) is rotated, each LED (420', 420", 420''') is activated to direct light through the integrating tunnel (415). The output of each LED (420', 420", 420''') may thus be temporally combined. For ease of reference, a red LED (420') will be discussed in describing the general operation of the light source module (400).

The LED color wheel (405) is configured to receive power inductively. The secondary transformer coils (425) according to the present exemplary embodiment are located toward the perimeter of the disc (440). Further, the secondary transformer coils (425) are sized to fit between a gap defined in the primary transformer coil (410). The primary transformer coil (410), which may be substantially stationary relative to the LED color wheel (405), is positioned such that the secondary transformer coils (425) pass through the primary transformer coil (410) through the gap as the LED color wheel (405) is rotated. As each second transformer coil (425) passes through the first transformer coil (425), the second transformer coil (425) is inductively coupled thereto. The inductive coupling between the first transformer coil (410) and each of the second transfer coils (425) provides power to an associated LED (420'), as will now be discussed in more detail.

The power from the inductive coupling of the first transformer coil (410) and the second transformer coil (425) is conditioned by the circuitry (430). In particular, the circuitry (430) receives the power from the second transformer coil (425) and ensures that the power received therefrom is at a suitable level for use by the LED (420'). The power is then conveyed to the LED (420).

The power conveyed to the LED (420') overdrives the LED (420') for a short period. As discussed above, the use of a pulsed light source may allow the light source to be operated at a relatively high power level. According to the present exemplary embodiment, the power conveyed to the LED (420') is at a higher level than the power level corresponding to steady state operation. Thus, the light output by the LED (420') is of increased brightness.

Further, the LEDs (420', 420", 420''') according to the present exemplary embodiment are configured to provide sequentially color-varying light. In particular, the LEDs (420', 420", 420''') according to the present exemplary embodiment are configured to sequentially generate red, blue, and then green light. The sequencing and duration of the pulse of the LEDs may be optimized, as will now be discussed in more detail.

Reference will be made to a leading and a trailing LED to discuss the pulsing of the LEDs (420', 420", 420'''). If the trailing LED is configured to generate the same color of light as the leading LED, the pulse of the leading and trailing LEDs may overlap, such that end of the pulse generated by the leading LED overlaps with the beginning of the pulse of the trailing LED. For example, if the leading and trailing LEDs are both red LEDs (420'), it may be desirable for the pulses to overlap. The same may be true if the leading and trailing LEDs are green in another case or blue in yet another case.

In addition, if the trailing LED is configured to generate a different color of light than the leading LED, it may be desirable to reduce overlap between the pulses. For example, if the leading LED is a red LED (420') and the trailing LED is a green LED (420"), the leading red LED' (420') may stop operating before the trailing green LED (420") is activated, such that overlap between the red and green pulses are minimized.

The frequency with which the output of the LEDs (420', 420", 420''') are switched may be controlled by several factors. One such factor includes the angular velocity with which the rotating LED color wheel is rotated. According to the present exemplary embodiment, the LED color wheel (405) is coupled to a conventional fan blade and motor assembly. This configuration will now be discussed in more detail.

Figure 5:
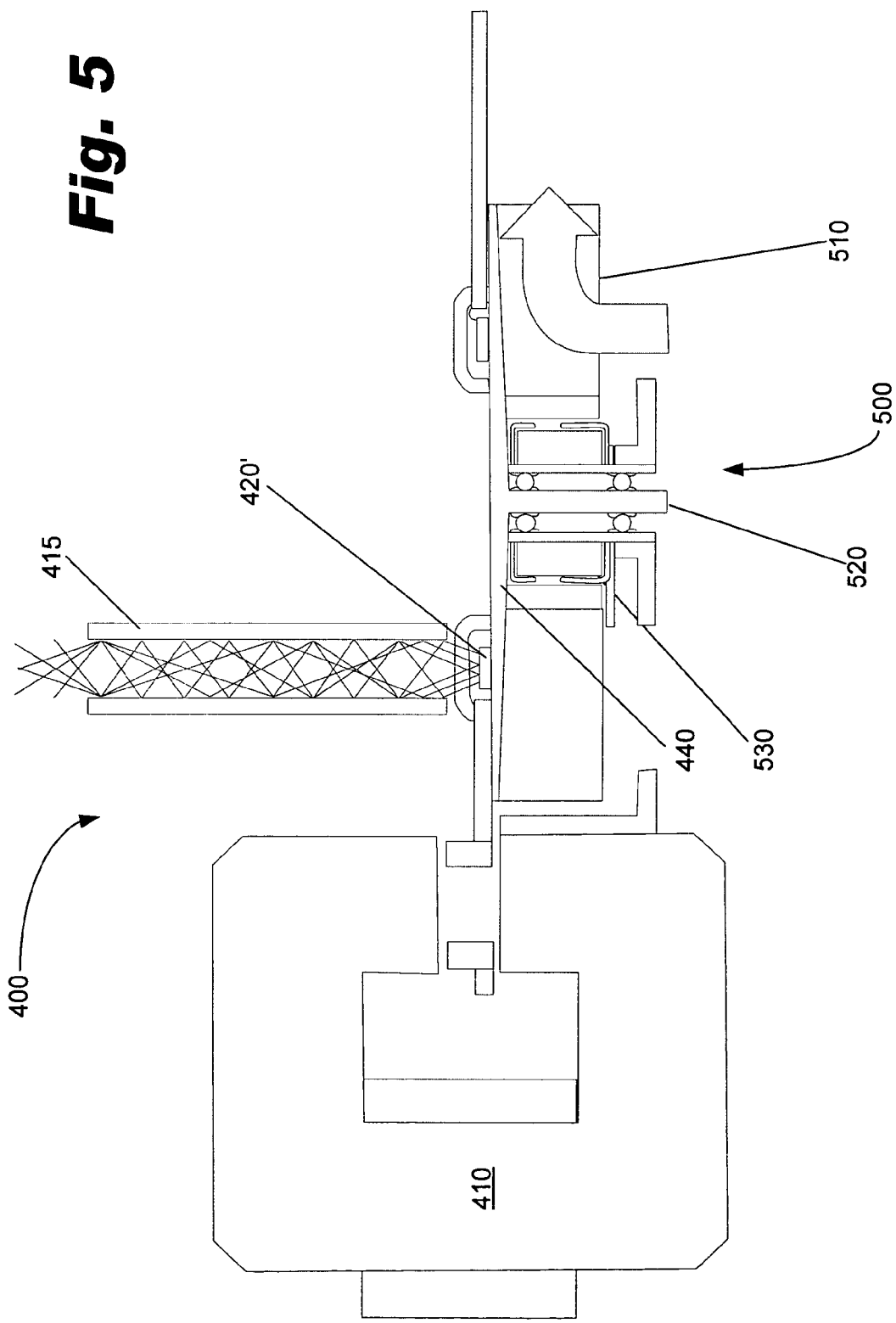
FIG. 5 is a cross-sectional view of the light source module of FIG. 4.

FIG. 5 illustrates a partial cross sectional view of the light source module (400) shown in FIG. 4. As shown in FIG. 5, the disc (440) is coupled to a fan assembly (500). According to one exemplary embodiment, the fan assembly (500) is of a conventional brushless-type fan used in electronic cooling applications. The fan assembly (500) generally includes a plurality of blades (510), a rotor (520), and a DC motor stator (530). The DC motor stator (530) drives the rotor (520), as is well known in the art. The rotor (520) is coupled to the blades (510) and the disc (440). Thus, as the rotor (520) rotates, the blades (510) and the disc (440) also rotate.

Rotation of the blades (510) provides additional cooling for the LEDs (420', 420", 420''', FIG. 4). The disc (440) supports the LEDs (420', 420", 420''') as previously discussed. Thus, the disc (440) may be in close proximity with the LEDs (420', 420", 420"'). As the LEDs (420', 420", 420''') are operated, a portion of the heat generated will be transferred to the disc (440). The rotation of the blades (510) creates an airflow that impinges on the disc (440). This airflow convectively cools the disc (440), thereby removing a portion of the heat generated by the operation of the LEDs (420', 420", 420'''). As the disc (440) rotates, the entire LED color wheel rotates as described above. The speed with which the disc (440) rotates determines the angular velocity of the LEDs (420', 420", 420'''; FIG. 4), and thus the frequency with which each cycle of sequentially varying light will be produced.

The preceding description has been presented only to illustrate and describe the present method and apparatus. It is not intended to be exhaustive or to limit the disclosure to any precise form disclosed. Many modifications and variations are possible in light of the above teaching. It is intended that the scope of the disclosure be defined by the following claims.

What is claimed is:

1. An active color wheel, comprising:
   a plurality of light sources configured to be moved through a period of motion, said plurality of light sources being configured to be activated over a range of said period of motion; and
   a processing unit controlling said light sources that activates individual said light sources such that activation of a leading light source of said plurality of light sources overlaps with activation of a next trailing light source of said plurality of light sources.

2. The active color wheel of claim 1, wherein said light sources include light emitting diodes.

3. The active color wheel of claim 1, wherein said light sources are configured to produce sequentially-color varying light.

4. The active color wheel of claim 3, wherein said light sources are configured to produce red, blue, and green sequentially-color varying light.

5. The active color wheel of claim 1, wherein said light sources are overdriven when said plurality of light sources are moved through at least a portion of said range.

6. The active color wheel of claim 1, and further comprising:
   a support,
   transformer coils, and
   circuitry,
   wherein said support supports said light sources, said transformer coils and said circuitry, and
   wherein said circuitry couples each of said light sources to one of said transformer coils.

7. The active color wheel of claim 6, wherein said support is coupled to a fan assembly.

8. The active color wheel of claim 1, wherein a trailing light source is activated during activation of a leading light source only if said trailing and leading light sources are a same color, said trailing light source not being activated during activation of said leading light source if said trailing and leading light sources are different colors.

9. The active color wheel of claim 1, further comprising a primary transformer coil configured to provide power to said light sources.

10. The active color wheel of claim 9, and further comprising a plurality of secondary transformer coils and circuitry, said circuitry coupling at least one of said plurality of secondary transformer coils to each of said light sources.

11. A light source module, comprising:
   a plurality of light sources arranged in a circle;
   a motive source configured to rotate said light sources through a circular period of motion;
   a primary transformer coil; and
   a plurality of secondary transformer coils and circuitry, said circuitry coupling at least one of said plurality of secondary transformer coils to each of said light sources; said primary transformer coil and said plurality of secondary transformer coils being configured to supply power to each of said plurality of light sources during an arc of said rotation corresponding to an intended etendue.

12. The light source module of claim 11, wherein said light sources include light emitting diodes.

13. The light source module of claim 12, wherein said light emitting diodes include red, blue, and green light emitting diodes.

14. The light source module of claim 11, wherein said motive source includes a fan assembly.

15. The light source module of claim 11, wherein said power source is configured to overdrive said light sources.

16. The light source module of claim 11, and further comprising an integrator device in optical communication with said light sources.

17. The light source module of claim 16, wherein said integrator device includes an integrator tunnel.

18. A method of modulating light, comprising:
   moving a plurality of light sources through a period of motion; and
   individually operating said light sources for a portion of said period of motion;
   wherein a trailing light source is activated during activation of a leading light source only if said trailing and leading light sources are a same color, said trailing light source not being activated during activation of said leading light source if said trailing and leading light sources are different colors.

19. The method of claim 18, wherein moving said plurality of light sources includes driving a fan assembly.

20. The method of claim 18, and further comprising reducing power provided to said light sources while said light sources are outside of said portion of said period of motion.

21. The method of claim 18, wherein operating said light sources includes sequentially operating said light sources to generate sequentially-color varying light.

22. The method of claim 18, wherein operating said light sources includes operating light emitting diode light sources.

23. The method of claim 22, wherein operating said light emitting diode light sources includes overdriving said light sources for at least a part of said portion of said period of motion.

24. The method of claim 18, wherein operating said light sources includes inductively powering said light sources.

25. A light source module, comprising:
   means for generating light comprising a plurality of individual light sources;
   means for moving said means for generating light through a period of motion; and
   means for selectively activating said individual light sources during a portion of said period of motion;
   wherein a trailing light source is activated during activation of a leading light source only if said trailing and leading light sources are a same color, said trailing light source not being activated during activation of said leading light source if said trailing and leading light sources are different colors.

26. The light source module of claim 25, and farther comprising means for overdriving said means for generating light.

27. The light source module of claim 25, and further comprising means for generating sequentially color varying light.

28. The light source module of claim 25, and further comprising means for spatially homogenizing an output of said means for generating light.

29. A display system, comprising:
   a light source module, including a plurality of light sources, a motive source configured to move said light sources through a period of motion, and a power source configured to activate said plurality of light sources over a portion of said period of motion; and a light modulator assembly in optical communication with said light source module;

wherein, under control of said power source, a trailing light source is activated during activation of a leading light source only if said trailing and leading light sources are a same color, said trailing light source not being activated during activation of said leading light source if said trailing and leading light sources are different colors.

30. The system of claim 29, wherein said light source module includes an integrating device and illumination optics.

31. The system of claim 29, wherein said light source module is configured to generate sequentially color varying light.

32. The system of claim 29, wherein said light source module is configured to overdrive said light sources for at least part of said portion of said period of motion.

* * * * *

UNITED STATES PATENT AND TRADEMARK OFFICE
CERTIFICATE OF CORRECTION

PATENT NO. : 7,497,579 B2 Page 1 of 1
APPLICATION NO. : 11/219421
DATED : March 3, 2009
INVENTOR(S) : Scott Lerner et al.

It is certified that error appears in the above-identified patent and that said Letters Patent is hereby corrected as shown below:

In column 3, line 2, delete "fly" and insert -- By --, therefor.

In column 3, line 3, delete "rotation1" and insert -- rotation, --, therefor.

In column 8, line 56, in Claim 26, delete "farther" and insert -- further --, therefor.

Signed and Sealed this

Twenty-eighth Day of July, 2009

JOHN DOLL
*Acting Director of the United States Patent and Trademark Office*